(12) United States Patent
Barker

(10) Patent No.: US 10,407,294 B2
(45) Date of Patent: Sep. 10, 2019

(54) FUEL ISLAND REDUNDANT MONITORING SYSTEM

(71) Applicant: R. Keith Barker, Walhalla, SC (US)

(72) Inventor: R. Keith Barker, Walhalla, SC (US)

(73) Assignee: HOLYSTONE USA, INC., Reisterstown, MD (US)

( * ) Notice: Subject to any disclaimer, the term of this patent is extended or adjusted under 35 U.S.C. 154(b) by 78 days.

(21) Appl. No.: 15/289,320

(22) Filed: Oct. 10, 2016

(65) Prior Publication Data

US 2017/0029265 A1 Feb. 2, 2017

Related U.S. Application Data

(63) Continuation-in-part of application No. 14/264,798, filed on Apr. 29, 2014, now abandoned.

(60) Provisional application No. 61/854,734, filed on Apr. 30, 2013.

(51) Int. Cl.
| | |
|---|---|
| *B67D 7/00* | (2010.01) |
| *B67D 7/22* | (2010.01) |
| *B60S 5/02* | (2006.01) |
| *B67D 7/14* | (2010.01) |

(52) U.S. Cl.
CPC .............. *B67D 7/222* (2013.01); *B60S 5/02* (2013.01); *B67D 7/145* (2013.01)

(58) Field of Classification Search
CPC ............ G07F 13/025; B60S 5/02; B67D 7/04
USPC .......................................... 705/413; 700/241
See application file for complete search history.

(56) References Cited

U.S. PATENT DOCUMENTS

| | | | |
|---|---|---|---|
| 5,596,501 A | 1/1997 | Comer et al. | |
| 6,259,956 B1* | 7/2001 | Myers | G06Q 10/06 700/244 |
| 6,523,744 B2* | 2/2003 | Royal, Jr. | B67D 7/222 235/381 |
| 9,104,993 B2* | 8/2015 | Miller | H04L 12/4633 |
| 2001/0034567 A1* | 10/2001 | Allen | G06F 8/65 700/283 |
| 2002/0128988 A1* | 9/2002 | Covington | B67D 7/14 705/413 |
| 2009/0187416 A1 | 7/2009 | Baer et al. | |
| 2010/0023162 A1* | 1/2010 | Gresak | B67D 7/08 700/241 |
| 2013/0246171 A1* | 9/2013 | Carapelli | G06Q 20/3278 705/14.51 |

* cited by examiner

*Primary Examiner* — Timothy R Waggoner
(74) *Attorney, Agent, or Firm* — Thomas C. Saitta

(57) ABSTRACT

A fuel island redundant monitoring system having sensors of varying purpose to transmit data signals to dual remote monitoring stations. One monitoring site is a live monitoring station manned by personnel. The other monitoring station is a data receiving station utilizing unmanned machines, e.g., computers. The unmanned data station is capable of transmitting information to the manned monitoring station, to local fuel island managers and/or to local emergency responders, and/or to control equipment at the fuel island. The manned monitoring station is capable of transmitting commands or inquiries to the unmanned data station and/or to control equipment at the fuel island, and/or to local fuel island managers and/or to local emergency responders. Sensors may be dedicated to either the unmanned data station or the manned live monitoring station, or may send data to both stations.

18 Claims, 1 Drawing Sheet

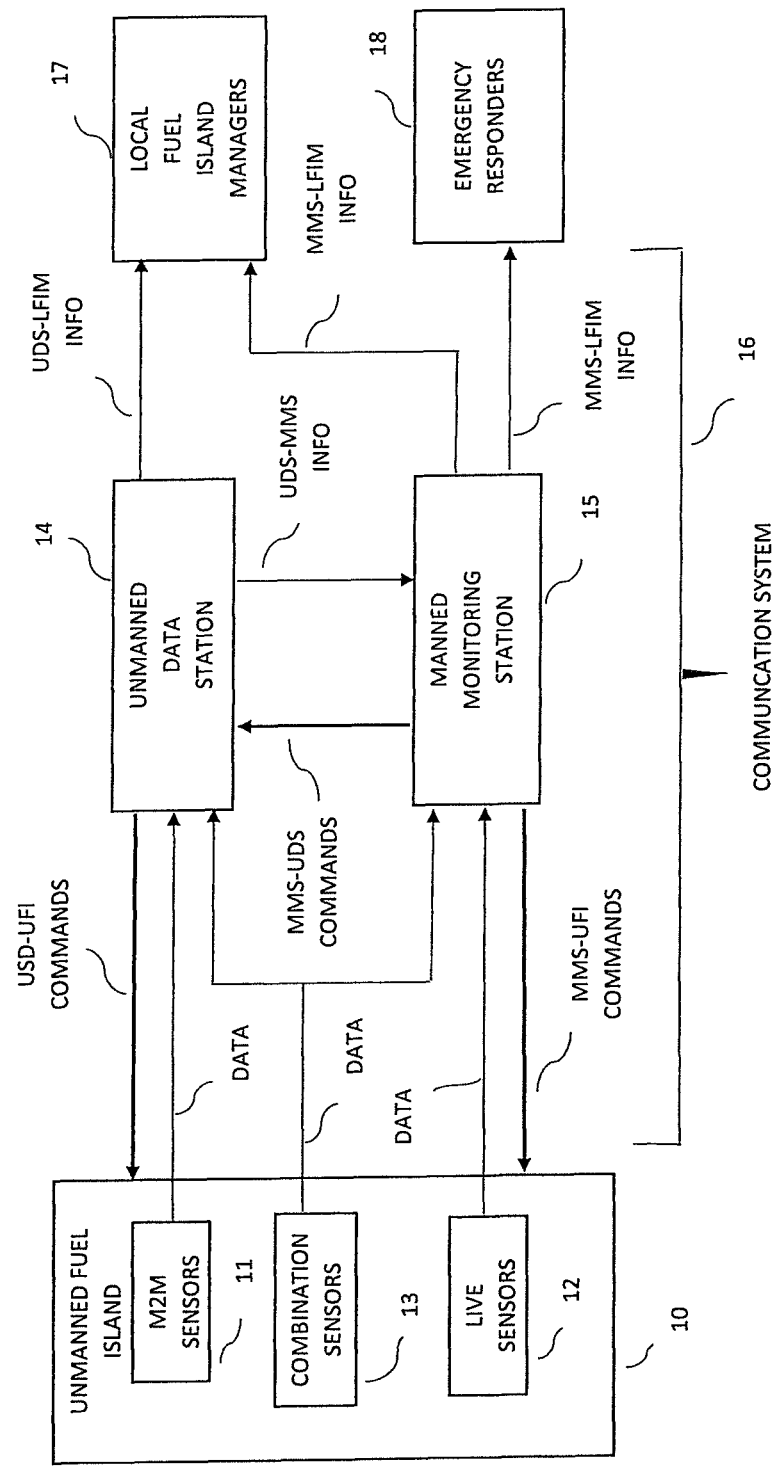

FUEL ISLAND REDUNDANT MONITORING SYSTEM

This application is a continuation-in-part application of U.S. patent application Ser. No. 14/264,798, filed Apr. 29, 2014, claiming the benefit of U.S. Provisional Patent Application Ser. No. 61/854,734, filed Apr. 29, 2013, the disclosures of which are incorporated herein by reference.

BACKGROUND OF THE INVENTION

This application relates generally to the field of remote monitoring, and in particular relates to remote monitoring of unmanned facilities, and even more particularly relates to remote monitoring of unmanned vehicle fuel dispensing stations.

Vehicle fuel dispensing or refueling stations, typically referred to as gas stations or fuel islands, number in the hundreds of thousands. Typical stations utilize employees, sometimes having the employees dispense the gasoline into the vehicles of individual customers, and at other times having one or more employees simply oversee the facility in the event there is an issue that needs to be addressed, the customers filling their own vehicles in a "self-service" manner and paying at the pump with a credit card. With the exception of fleet refueling stations, most fire marshal regulatory codes require the presence of an on-site employee to address emergencies, such as manually shutting off gas flow to the pumps or notifying emergency responders in the event of a fire.

It would be beneficial to the owners of the fuel islands to be able to operate under the self-service model without the requirement of maintaining an employee on-site. With an unmanned fuel island, systems must be in place 24 hours a day, 7 days a week to monitor multiple aspects of the fuel island to determine if there are any issues of concern. It is an object of this invention to provide a fuel island redundant monitoring system for use with an unmanned fuel island that meets and exceeds regulatory safety requirements, the monitoring occurring at a geographically spaced location from the fuel island, with the monitoring system being redundant such that both live personnel and automatic machine monitoring can occur separately and simultaneously.

SUMMARY OF THE INVENTION

A redundant monitoring system is provided for an unmanned fuel island, with the monitoring occurring remotely from the fuel island. Sensors of varying purpose are provided at the fuel island to transmit data to dual monitoring stations. One monitoring site is a live monitoring station manned by personnel. The other monitoring station is a data receiving station utilizing unmanned machines, e.g., computers. The unmanned data station is capable of transmitting information to the manned monitoring station, to local fuel island managers and/or to local emergency responders. The unmanned data station is also capable of transmitting commands or inquiries to control equipment at the fuel island. In some instances the commands or inquiries are automatically transmitted from the unmanned data station to the fuel island without receiving instructions or commands from the manned monitoring station. The manned monitoring station is capable of transmitting commands or inquiries to the unmanned data station and/or to control equipment at the fuel island. The manned monitoring station is also capable of transmitting information to local fuel island managers and/or to local emergency responders. Sensors may be dedicated to either the unmanned data station or the manned live monitoring station, or may send data to both stations. Examples of sensors include fire sensors, heat sensors, video surveillance cameras, spill detectors, smoke detectors, lead detectors, vapor detectors, etc., as well as sensors dedicated to particular equipment located at the fuel island to provide data on temperature, pressure, suction, gasket leaks, fuel inventory, preventive maintenance scheduling, etc.

In alternative terminology, the invention in various embodiments is an unmanned fuel island monitoring system comprising: an unmanned fuel island, an unmanned data station and a manned monitoring station, said unmanned data station and said manned monitoring station geographically distant from said unmanned fuel island; said unmanned fuel island delivering fuel to self-service consumers on demand; a plurality of fuel island monitoring sensors incorporated in said fuel island, a first set of said monitoring sensors comprising machine-to-machine sensors transmitting machine-to-machine data to said unmanned data station, and a second set of said monitoring sensors comprising live sensors transmitting live sensor data to said manned monitoring station; said unmanned data station receiving said machine-to-machine data from said unmanned fuel island, transmitting UDS-UFI commands to said unmanned fuel island, transmitting UDS-MMS information to said manned monitoring station, and receiving MMS-UDS commands from said manned monitoring station; said manned monitoring station receiving said live sensor data from said unmanned fuel island, receiving said UDS-MMS information from said unmanned data station, transmitting MMS-UDS commands to said unmanned data station, and transmitting MMS-UFI commands to said unmanned fuel island; said unmanned fuel island receiving said UDS-UFI commands and said MMS-UFI commands; said machine-to-machine data transmitted to said unmanned data station comprising automatic response data and non-automatic response data; wherein said unmanned data station, in response to receiving said non-automatic response data from said machine-to-machine sensors of said unmanned fuel island, transmits said UDS-MMS information to said manned monitoring station, and wherein said unmanned data station, in response to receiving said automatic response data from said machine-to-machine sensors of said unmanned fuel island, automatically transmits said UDS-UFI commands to said unmanned fuel island. Furthermore, in various embodiments such a system wherein said unmanned data station being geographically distant from manned monitoring station; wherein said machine-to-machine data is transmitted directly to said unmanned data station, said live sensor data is transmitted directly to said manned monitoring station; wherein said UDS-UFI commands are transmitted directly to said unmanned fuel island, said UDS-MMS information is transmitted directly to said manned monitoring station, said MMS-UFI commands are transmitted directly to said unmanned fuel island, and said MMS-UDS commands are transmitted directly to said unmanned data station; wherein said unmanned data station transmits UDS-LFIM information to local fuel island managers, and said manned monitoring station transmits MMS-LFIM information to local fuel island managers; wherein said unmanned data station transmits UDS-LFIM information to emergency responders, and said manned monitoring station transmits MMS-LFIM information to emergency responders; said plurality of fuel island monitoring sensors further comprising a third set of said monitoring sensors comprising combination sensors transmitting combination sensor data to both said unmanned data station and said manned monitoring station, wherein said unmanned data station and said manned monitoring station each receive said combination sensor data; further comprising a communication system connecting said fuel island, said unmanned data station and said manned monitoring station; and/or wherein said communication system connects said unmanned data station to local fuel island managers and connects said manned monitoring station to said local fuel island managers and to emergency responders.

Alternatively, the invention in various embodiments is a method of monitoring an unmanned fuel island monitoring system by personnel in a manned monitoring station comprising the steps of: providing an unmanned fuel island monitoring system comprising: an unmanned fuel island, an unmanned data station and a manned monitoring station, said unmanned data station and said manned monitoring station geographically distant from said unmanned fuel island; said unmanned fuel island delivering fuel to self-service consumers on demand; a plurality of fuel island monitoring sensors incorporated in said fuel island, a first set of said monitoring sensors comprising machine-to-machine sensors transmitting machine-to-machine data to said unmanned data station, and a second set of said monitoring sensors comprising live sensors transmitting live sensor data to said manned monitoring station; said unmanned data station receiving said machine-to-machine data from said unmanned fuel island, transmitting UDS-UFI commands to said unmanned fuel island, transmitting UDS-MMS information to said manned monitoring station, and receiving MMS-UDS commands from said manned monitoring station; said manned monitoring station receiving said live sensor data from said unmanned fuel island, receiving said UDS-MMS information from said unmanned data station, transmitting MMS-UDS commands to said unmanned data station, and transmitting MMS-UFI commands to said unmanned fuel island; said unmanned fuel island receiving said UDS-UFI commands and said MMS-UFI commands; said machine-to-machine data transmitted to said unmanned data station comprising automatic response data and non-automatic response data; wherein said unmanned data station, in response to receiving said non-automatic response data from said machine-to-machine sensors of said unmanned fuel island, transmits said UDS-MMS information to said manned monitoring station, and wherein said unmanned data station, in response to receiving said automatic response data from said machine-to-machine sensors of said unmanned fuel island, automatically transmits said UDS-UFI commands to said unmanned fuel island; monitoring said machine-to-machine data transmitted from said unmanned fuel island to said manned monitoring station and monitoring said live sensor information transmitted from said unmanned data station to said manned monitoring station; sending said MMS-UFI commands to said unmanned fuel island and/or sending said MMS-UDS commands to said unmanned data station. In further embodiments, the invention is such method further comprising the steps of: providing a third set of said monitoring sensors at said fuel station comprising combination sensors transmitting combination sensor data to both said unmanned data station and said manned monitoring station; and monitoring said combination sensor data transmitted from said combination sensors of said fuel island; and/or further comprising the steps of contacting local fuel island managers and/or emergency personnel.

BRIEF DESCRIPTION OF THE DRAWINGS

FIG. 1 is a schematic illustration of an exemplary embodiment of the system.

DETAILED DESCRIPTION OF THE INVENTION

With reference to the drawings, the invention will be described in detail and with a non-limiting preferred embodiment. The invention in general is a fuel island redundant monitoring system wherein the monitoring of the unmanned fuel island is performed at one or more geographically distant sites remote from the fuel island, wherein the data is transmitted from sensors situated at the fuel island to an unmanned data station and a manned monitoring station, with communication between the sensors, the fuel island, the unmanned data station and the manned monitoring station, and further with local (relative to the fuel island) fuel island managers and emergency responders. The term "fuel island" as used herein refers a vehicle fuel dispensing or refueling facility where individuals bring in vehicles for self-service refueling, commonly referred to for example as a gas station. The fuel island may be open to the public or may be utilized by particular members or companies having privileges at the fuel island, such as for example fleet refueling stations. The term "geographically distant" shall refer to two locations separated a significant distance from each other such that movement of a person from one location to the other cannot be done in a reasonable amount of time without use of vehicle transportation. Put another way, personnel resident at the manned monitoring station cannot immediately get to the unmanned fuel island to respond to emergencies.

The unmanned fuel island 10 comprises one or more fuel pumps for self-service dispensing of fuel into vehicles when the vehicles are driven to the fuel island 10. Activation of the fuel pumps will require the use of an identity or member card, a credit card, a keypad code or the like. Many of the operational components or equipment of the unmanned fuel island 10 are standard, such as mechanical fuel pumps, electrical systems, lighting systems, etc. In addition to such standard equipment, the unmanned fuel island 10 is provided with a plurality of sensors, the sensors being capable of transmitting data signals through a communication system 16, such as via hard wire, radio frequency, WiFi, Internet connections, etc., to geographically remote data receiving stations—one such station being a manned monitoring station 15 with live personnel on-site responding to the received data and the other such station being an unmanned data station 14.

The sensors will be of varied type, one set of sensors 11 monitoring equipment or machine parameters and transmitting machine-to-machine data through the communication system 16 to machines, i.e., computers or the like, in the unmanned data station 14, such sensors being referred to herein as machine-to-machine or M2M sensors 11. Such M2M sensors 11 are usually dedicated to machinery and equipment at the unmanned fuel island 10, such as for example fuel pumps, light fixtures, etc., and will monitor issues of concern relative to the equipment, such as for example temperature, pressure, suction, vibration, flow, gasket leaks, amount of use, bulb failures, etc. The machine-to-machine data may be continuously or intermittently transmitted, or be transmitted only upon a negative occurrence when an issue needs to be addressed. The machine-to-machine data transmitted by the machine-to-machine sensors 11 comprises automatic response data and non-automatic response data. Automatic response data is machine-to-machine data transmitted to the unmanned data station 14 that may initiate an automatic response from the unmanned data station 14, i.e., a UDS-UFI command, to the unmanned fuel island 10 without any action or commands on the part of the manned monitoring station 15.

A second set of fuel island sensors are designated as live sensors 12 capable of transmitting live sensor data through the communication system 16 to the manned monitoring station 15. These live sensors 12 will monitor different issues of concern and may include for example fire sensors, heat sensors, video surveillance cameras, spill detectors, smoke detectors, lead detectors, vapor detectors, etc. As with the M2M sensors 11, the live sensor data may be continuously or intermittently transmitted, or be transmitted only upon a negative occurrence when an issue needs to be addressed immediately by the on-site personnel of the manned monitoring station 15.

Optionally, a third set of sensors, designated as combination sensors 13, may be provided at the fuel island 10 in addition to or in place of certain M2M sensors 11 and/or live sensors 12. The combination sensors 13 transmit combination sensor data from the fuel island 10 to both the manned monitoring station 15 and the unmanned data station 14, thereby providing a secondary redundancy in addition to the primary redundancy of having an unmanned data station 14 and a manned monitoring station 15 remotely separated from the fuel island geographic location.

It is also contemplated that redundant sensors may be provided, such as for example having an M2M sensor 11 and a live sensor 12 that each detect smoke, or by providing sets of identical sensors, such as for example, two identical live sensors 12 for smoke detection, such that one such sensor may remain operational if fire were to disable the other smoke detector sensor.

The unmanned data station 14 and the manned monitoring station 15 may occupy separate locations or the same location, and the stations 14 and 15 may be in communication with multiple fuel islands 10. The stations 14 and 15 may be hundreds or thousands of miles from the fuel islands 10.

The unmanned data station 14 comprises equipment or machinery, such as computers or the like, to receive and analyze the machine-to-machine data transmitted from the M2M sensors 11 and/or the combination sensors 13. In the event of situations that need to be addressed, or reports that are to be delivered on a periodic basis, etc., the machine-to-machine data transmitted by the unmanned fuel island 10 is non-automatic response data, the unmanned data station 14 transmits UDS-MMS information through the communication system 16 to the manned monitoring station 15. If the machine-to-machine data is automatic response data, the unamend data station transmits UDS-UFI commands, which may include inquiries to sensors, back to the equipment at the fuel island 10, and/or UDS-LFIM information to fuel island owners or managers 17, often geographically local to the fuel island 10.

For example, if an M2M sensor 12 detects that a fuel pump motor is overheating, the machine-to-machine data is transmitted to the unmanned data station 14. The unmanned data station 14 may then transmit this UDS-MMS information to the manned monitoring station 15 for validation and/or further action if the machine-to-machine data is non-automatic response data, or may automatically transmit a UDS-UFI command to the fuel island 10 to shut off the fuel pump motor if the machine-to-machine data is automatic response data, this UDS-UFI command being transmitted without receiving a MMS-UDS command from the manned monitoring station 15. In the event of periodic reporting on equipment status at the fuel island 10, the unmanned data station 14 may transmit this UDS-LFIM information directly to the local fuel island managers 17.

The manned monitoring station 15 utilizes human personnel to analyze and respond appropriately to live sensor data received from the fuel island live sensors 12 and/or the combination sensors 13, and/or to UDS-MMS information received directly from the unmanned data station 14. Preferably the personnel are trained in fuel island management and safety. The manned monitoring station 15 is capable of transmitting MMS-UDS commands, including inquires, to the unmanned data station 14 in order to verify the UDS-MMS information received from the manned data station 14 or to seek secondary verification of the machine-to-machine data received from the sensors incorporated in the fuel island 10, or to instruct the unmanned data station 14 to make inquiry of the dedicated M2M sensors 11. As with the unmanned data station 14, the manned monitoring station 15 is preferably capable of transmitting MMS-UFI commands, including inquiries, to the fuel island 10, such that some issues may be verified by making inquiry of other live sensors 12, while others may be remotely rectified by the manned monitoring station 15, such as for example by remotely shutting off the fuel delivery pumps. The manned data station 15 is also capable of transmitting MMS-LFIM information to the local fuel island managers 17 if personnel need to be sent to the unmanned fuel island 10, and in the case of an emergency, such as visual evidence of a fire shown by a live sensor 13 or a large pressure drop in one of the fuel storage tanks being detected by an M2M sensor 12, such pressure drop potentially indicating a catastrophic failure with loss of large amounts of fuel, may also transmit this MMS-LFIM information to local emergency responders 18 for immediate response.

Other examples of the system response to situations:

The manned monitoring station 15 is alerted to a haze at the fuel island 10, by live sensors 12 or combination sensors 13, and/or by UDS-MMS information transmitted from the unmanned data station 14 in response to machine-to-machine data from M2M sensors 11 or combination sensor data from combination sensors 13, and/or by direct contact from customers through voice or text communication, which may be part of the communication system 16. To determine whether this haze is a natural weather occurrence or the result of a fire, personnel in the manned monitoring station 15 review live sensor data from live sensors 12, such as a video camera, and also review UDS-MMS information received from the unmanned data station 14, such as an abnormal temperature increase or detection of smoke. In the event a problem is verified, appropriate steps are taken, such as alerting the emergency responders 18, shutting off the fuel pumps, etc.

A driver leaves a fuel island 10 with the pump still inserted into the vehicle tank, breaking the hose and resulting in uncontrolled flow of fuel from the pump. M2M sensors 11 transmit the machine-to-machine data to the unmanned data station 14 indicating this problem, and UDS-MMS information is immediately transmitted to the manned monitoring station 15. Visual confirmation is made by the live camera sensor 11 and the personnel verify that the unmanned data station 14 has transmitted a UDS-UFI command to the fuel island 10 to shut off the fuel pump. If not, the manned monitoring station 15 transmits the MMS-UFI command. The fuel island manager 17 is then alerted.

Thus, the invention in various embodiments is an unmanned fuel island monitoring system comprising: an unmanned fuel island 10, an unmanned data station 14 and a manned monitoring station 15, the unmanned data station 14 and the manned monitoring station 15 being geographically distant from the unmanned fuel island 10; the unmanned fuel island 10 delivering fuel to self-service consumers on demand; a plurality of fuel island monitoring sensors incorporated in the fuel island 10, a first set of the monitoring sensors comprising machine-to-machine sensors 11 transmitting machine-to-machine data to the unmanned data station 14, and a second set of the monitoring sensors comprising live sensors 12 transmitting live sensor data to the manned monitoring station 15; the unmanned data station 14 receiving the machine-to-machine data from the unmanned fuel island 10, transmitting UDS-UFI commands to the unmanned fuel island 10, transmitting UDS-MMS information to the manned monitoring station 15, and receiving MMS-UDS commands from the manned monitoring station 15; the manned monitoring station 15 receiving the live sensor data from the unmanned fuel island 10, receiving the UDS-MMS information from the unmanned data station 14, transmitting MMS-UDS commands to the unmanned data station 14, and transmitting MMS-UFI commands to the unmanned fuel island 19; the unmanned fuel island 10 receiving the UDS-UFI commands and the MMS-UFI commands; the machine-to-machine data transmitted to the unmanned data station comprising automatic response data and non-automatic response data; wherein the unmanned data station 14, in response to receiving the non-automatic response data from the machine-to-machine sensors 11 of the unmanned fuel island 10, transmits the UDS-MMS information to the manned monitoring station 15, and wherein the unmanned data station 14, in response to receiving the automatic response data from the machine-to-machine sensors 11 of the unmanned fuel island 10, automatically transmits the UDS-UFI commands to the unmanned fuel island 10. Furthermore, in various embodiments such a system wherein the unmanned data station 14 being geographically distant from the manned monitoring station 15; wherein the machine-to-machine data is transmitted directly to the unmanned data station 14, the live sensor data is transmitted directly to the manned monitoring station 15; wherein the UDS-UFI commands are transmitted directly to the unmanned fuel island 10, the UDS-MMS information is transmitted directly to the manned monitoring station 15, the MMS-UFI commands are transmitted directly to the unmanned fuel island 10, and the MMS-UDS commands are transmitted directly to the unmanned data station 14; wherein the unmanned data station 14 transmits UDS-LFIM information to local fuel island managers 17, and the manned monitoring station 15 transmits MMS-LFIM information to local fuel island managers 17; wherein the unmanned data station 14 transmits UDS-LFIM information to emergency responders 18, and the manned monitoring station 15 transmits MMS-LFIM information to emergency responders 18; the plurality of fuel island monitoring sensors further comprising a third set of said monitoring sensors comprising combination sensors 13 transmitting combination sensor data to both the unmanned data station 14 and the manned monitoring station 15, wherein the unmanned data station 14 and the manned monitoring station 15 each receive the combination sensor data; further comprising a communication system 16 connecting the fuel island 10, the unmanned data station 14 and the manned monitoring station 15; and/or wherein the communication system 16 connects the unmanned data station 14 to local fuel island managers 17 and connects the manned monitoring station 15 to said local fuel island managers 17 and to emergency responders 18.

Alternatively, the invention in various embodiments is a method of monitoring an unmanned fuel island monitoring system by personnel in a manned monitoring station 15 comprising the steps of: providing an unmanned fuel island monitoring system comprising: an unmanned fuel island 10, an unmanned data station 14 and a manned monitoring station 15, the unmanned data station 14 and the manned monitoring station 15 geographically distant from the unmanned fuel island 10; the unmanned fuel island 10 delivering fuel to self-service consumers on demand; a plurality of fuel island monitoring sensors incorporated in the fuel island 10, a first set of the monitoring sensors comprising machine-to-machine sensors 11 transmitting machine-to-machine data to the unmanned data station 14, and a second set of said monitoring sensors comprising live sensors 12 transmitting live sensor data to the manned monitoring station 15; the unmanned data station 14 receiving the machine-to-machine data from the unmanned fuel island 10, transmitting UDS-UFI commands to the unmanned fuel island 10, transmitting UDS-MMS information to the manned monitoring station 15, and receiving MMS-UDS commands from the manned monitoring station 15; the manned monitoring station 15 receiving the live sensor data from the unmanned fuel island 10, receiving the UDS-MMS information from the unmanned data station 14, transmitting MMS-UDS commands to the unmanned data station 14, and transmitting MMS-UFI commands to the unmanned fuel island 10; the unmanned fuel island 10 receiving the UDS-UFI commands and the MMS-UFI commands; the machine-to-machine data transmitted to the unmanned data station 14 comprising automatic response data and non-automatic response data; wherein the unmanned data station 14, in response to receiving the non-automatic response data from the machine-to-machine sensors 11 of the unmanned fuel island 10, transmits the UDS-MMS information to the manned monitoring station 15, and wherein the unmanned data station 14, in response to receiving the automatic response data from the machine-to-machine sensors 11 of the unmanned fuel island 10, automatically transmits the UDS-UFI commands to the unmanned fuel island 10; monitoring the machine-to-machine data transmitted from the unmanned fuel island 10 to the manned monitoring station 15 and monitoring the live sensor information transmitted from the unmanned data station 14 to the manned monitoring station 15; sending the MMS-UFI commands to the unmanned fuel island 10 and/or sending the MMS-UDS commands to the unmanned data station 14. In further embodiments, the invention is such method further comprising the steps of: providing a third set of the monitoring sensors at the fuel island 10 comprising combination sensors 13 transmitting combination sensor data to both the unmanned data station 14 and the manned monitoring station 15; and monitoring the combination sensor data transmitted from the combination sensors 13 of the fuel island 10; and/or further comprising the steps of contacting local fuel island managers 17 and/or emergency personnel 18.

It is understood that equivalents and substitutions for certain elements set forth and described above may be obvious to those of skill in the art, and therefore the true scope and definition of the invention is to be as set forth in the following claims.

I claim:

1. An unmanned fuel island monitoring system comprising:
   an unmanned fuel island, an unmanned data station and a manned monitoring station, said unmanned data station and said manned monitoring station geographically distant from said unmanned fuel island;
   said unmanned fuel island delivering fuel to self-service consumers on demand;
   a plurality of fuel island monitoring sensors incorporated in said fuel island, a first set of said monitoring sensors comprising machine-to-machine sensors transmitting machine-to-machine data to said unmanned data station, and a second set of said monitoring sensors comprising live sensors transmitting live sensor data to said manned monitoring station without transmitting said live sensor data through said unmanned data station;
   said unmanned data station receiving said machine-to-machine data from said unmanned fuel island, transmitting UDS-UFI commands to said unmanned fuel island, transmitting UDS-MMS information to said manned monitoring station, and receiving MMS-UDS commands from said manned monitoring station;
   said manned monitoring station receiving said live sensor data from said unmanned fuel island, receiving said UDS-MMS information from said unmanned data station, transmitting MMS-UDS commands to said unmanned data station, and transmitting MMS-UFI commands to said unmanned fuel island without transmitting said MMS-UFI commands through said unmanned data station;
   said unmanned fuel island receiving said UDS-UFI commands and said MMS-UFI commands;
   said machine-to-machine data transmitted to said unmanned data station comprising automatic response data and non-automatic response data;
   wherein said unmanned data station, in response to receiving said non-automatic response data from said machine-to-machine sensors of said unmanned fuel island, transmits said UDS-MMS information to said manned monitoring station, and wherein said unmanned data station, in response to receiving said automatic response data from said machine-to-machine sensors of said unmanned fuel island, automatically transmits said UDS-UFI commands to said unmanned fuel island without receiving MMS-UDS commands from said manned monitoring station.

2. The unmanned fuel island monitoring system of claim 1, said unmanned data station being geographically distant from said manned monitoring station.

3. The unmanned fuel island monitoring system of claim 1, wherein said unmanned data station transmits UDS-LFIM information to local fuel island managers and not to said manned monitoring station, and said manned monitoring station transmits MMS-LFIM information to said local fuel island managers and not to said unmanned data station.

4. The unmanned fuel island monitoring system of claim 1, wherein said manned monitoring station transmits MMS-LFIM information to emergency responders.

5. The unmanned fuel island monitoring system of claim 3, wherein said manned monitoring station transmits MMS-LFIM information to emergency.

6. The unmanned fuel island monitoring system of claim 1, said plurality of fuel island monitoring sensors further comprising a third set of said monitoring sensors comprising combination sensors transmitting combination sensor data to said unmanned data station and separately transmitting said combination sensor data to said manned monitoring station, wherein said unmanned data station and said manned monitoring station each receive said combination sensor data independently.

7. The unmanned fuel island monitoring system of claim 1, further comprising a communication system connecting said fuel island, said unmanned data station and said manned monitoring station.

8. The unmanned fuel island monitoring system of claim 7, wherein said communication system connects said unmanned data station to local fuel island managers and connects said manned monitoring station to said local fuel island managers and to emergency responders.

9. The unmanned fuel island monitoring system of claim 2, said plurality of fuel island monitoring sensors further comprising a third set of said monitoring sensors comprising combination sensors transmitting combination sensor data to said unmanned data station and separately transmitting said combination sensor data to said manned monitoring station, wherein said unmanned data station and said manned monitoring station each receive said combination sensor data independently.

10. A method of monitoring an unmanned fuel island monitoring system by personnel in a manned monitoring station comprising the steps of:
    providing an unmanned fuel island monitoring system comprising: an unmanned fuel island, an unmanned data station and a manned monitoring station, said unmanned data station and said manned monitoring station geographically distant from said unmanned fuel island; said unmanned fuel island delivering fuel to self-service consumers on demand; a plurality of fuel island monitoring sensors incorporated in said fuel island, a first set of said monitoring sensors comprising machine-to-machine sensors transmitting machine-to-machine data to said unmanned data station, and a second set of said monitoring sensors comprising live sensors transmitting live sensor data to said manned monitoring station independently of said unmanned data station; said unmanned data station receiving said machine-to-machine data from said unmanned fuel island, transmitting UDS-UFI commands to said unmanned fuel island, transmitting UDS-MMS information to said manned monitoring station, and receiving MMS-UDS commands from said manned monitoring station; said manned monitoring station receiving said live sensor data from said unmanned fuel island, receiving said UDS-MMS information from said unmanned data station, transmitting MMS-UDS commands to said unmanned data station, and transmitting MMS-UFI commands to said unmanned fuel island independently of said unmanned data station; said unmanned fuel island receiving said UDS-UFI commands and said MMS-UFI commands; said machine-to-machine data transmitted to said unmanned data station comprising automatic response data and non-automatic response data; wherein said unmanned data station, in response to receiving said non-automatic response data from said machine-to-machine sensors of said unmanned fuel island, transmits said UDS-MMS information to said manned monitoring station, and wherein said unmanned data station, in response to receiving said automatic response data from said machine-to-machine sensors of said unmanned fuel island, automatically transmits said UDS-UFI commands to said unmanned fuel island without receiving MMS-UDS commands from said manned monitoring station;

monitoring said machine-to-machine data transmitted from said unmanned fuel island to said manned monitoring station and monitoring said live sensor information transmitted from said unmanned data station to said manned monitoring station;

sending said MMS-UFI commands to said unmanned fuel island and/or sending said MMS-UDS commands to said unmanned data station.

11. The method of claim 10, further comprising the steps of:

providing a third set of said monitoring sensors at said unmanned fuel island comprising combination sensors transmitting combination sensor data to said unmanned data station and separately transmitting said combination sensor data to said manned monitoring station, wherein said unmanned data station and said manned monitoring station each receive said combination sensor data independently; and monitoring said combination sensor data transmitted from said combination sensors of said fuel island.

12. The method of claim 10, further comprising the steps of contacting local fuel island managers and/or emergency personnel.

13. The method of claim 11, further comprising the steps of contacting local fuel island managers and/or emergency personnel.

14. An unmanned fuel island monitoring system comprising:

an unmanned fuel island, an unmanned data station and a manned monitoring station, said unmanned data station and said manned monitoring station geographically distant from said unmanned fuel island, and said unmanned data station geographically distant from manned monitoring station;

said unmanned fuel island delivering fuel to self-service consumers on demand;

a plurality of fuel island monitoring sensors incorporated in said fuel island, a first set of said monitoring sensors comprising machine-to-machine sensors transmitting machine-to-machine data to said unmanned data station, a second set of said monitoring sensors comprising live sensors transmitting live sensor data to said manned monitoring station independently of said unmanned data station, and a third set of said monitoring sensors comprising combination sensors transmitting combination sensor data to said unmanned data station and separately transmitting said combination sensor data to said manned monitoring station, wherein said unmanned data station and said manned monitoring station each receive said combination sensor data independently;

said unmanned data station receiving said machine-to-machine data and said combination sensor data from said unmanned fuel island, transmitting UDS-UFI commands to said unmanned fuel island, transmitting UDS-MMS information to said manned monitoring station, and receiving MMS-UDS commands from said manned monitoring station;

said manned monitoring station receiving said live sensor data and said combination sensor data from said unmanned fuel island, receiving said UDS-MMS information from said unmanned data station, transmitting MMS-UDS commands to said unmanned data station, and transmitting MMS-UFI commands to said unmanned fuel island independently of said unmanned data station;

said unmanned fuel island receiving said UDS-UFI commands and said MMS-UFI commands;

said machine-to-machine data transmitted to said unmanned data station comprising automatic response data and non-automatic response data;

wherein said unmanned data station, in response to receiving said non-automatic response data from said machine-to-machine sensors of said unmanned fuel island, transmits said UDS-MMS information to said manned monitoring station, and wherein said unmanned data station, in response to receiving said automatic response data from said machine-to-machine sensors of said unmanned fuel island, automatically transmits said UDS-UFI commands to said unmanned fuel island;

and wherein said unmanned data station transmits UDS-LFIM information to local fuel island managers, and said manned monitoring station transmits MMS-LFIM information to local fuel island managers and/or emergency personnel.

15. The unmanned fuel island monitoring system of claim 12, wherein said unmanned data station transmits UDS-LFIM information to local fuel island managers, and said manned monitoring station transmits MMS-LFIM information to said local fuel island managers independently of said unmanned data station.

16. The unmanned fuel island monitoring system of claim 15, wherein said manned monitoring station transmits MMS-LFIM information to emergency responders independently of said unmanned data station.

17. The unmanned fuel island monitoring system of claim 14, wherein said unmanned data station transmits UDS-LFIM information to local fuel island managers, and said manned monitoring station transmits MMS-LFIM information to said local fuel island managers independently of said unmanned data station.

18. The unmanned fuel island monitoring system of claim 17, wherein said manned monitoring station transmits MMS-LFIM information to emergency responders independently of said unmanned data station.

* * * * *